(12) United States Patent
Frutschy et al.

(10) Patent No.: US 8,674,218 B2
(45) Date of Patent: Mar. 18, 2014

(54) RESTRAINT SYSTEM FOR AN ENERGY STORAGE DEVICE

(75) Inventors: Kristopher John Frutschy, Niskayuna, NY (US); William Waters, Scotia, NY (US); Keven Peat, Burton Upon Trent (GB); Stephen Brooker, Burton Upon Trent (GB)

(73) Assignee: General Electric Company, Schenectady, NY (US)

( * ) Notice: Subject to any disclaimer, the term of this patent is extended or adjusted under 35 U.S.C. 154(b) by 429 days.

(21) Appl. No.: 12/968,510

(22) Filed: Dec. 15, 2010

(65) Prior Publication Data

US 2012/0152586 A1 Jun. 21, 2012

(51) Int. Cl.
*H02G 3/08* (2006.01)
*H05K 7/14* (2006.01)

(52) U.S. Cl.
USPC ........ 174/50; 174/520; 361/679.01; 361/724; 248/225.11; 248/201

(58) Field of Classification Search
USPC .......... 174/50, 53, 57, 520, 559, 51; 220/3.2–3.9, 4.02; 361/600, 601, 724, 361/715, 725, 679.01, 727, 728, 729, 730, 361/752, 796, 797; 248/220.21, 201, 248/225.11, 200, 205.1, 236, 235, 250; 312/223.1, 223.2, 351.1
See application file for complete search history.

(56) References Cited

U.S. PATENT DOCUMENTS

| | | | |
|---|---|---|---|
| 4,054,319 A | 10/1977 | Fogg, Jr. et al. | |
| 4,077,158 A | 3/1978 | England | |
| 4,119,164 A | 10/1978 | Fogg, Jr. et al. | |
| 4,365,579 A | 12/1982 | Perez, Jr. | |
| 4,555,744 A * | 11/1985 | Maroney et al. | 361/797 |
| 4,772,444 A | 9/1988 | Curro et al. | |
| 4,776,340 A | 10/1988 | Moran et al. | |
| 4,778,644 A | 10/1988 | Curro et al. | |
| 4,813,634 A | 3/1989 | Zuck | |
| 4,846,821 A | 7/1989 | Lyons et al. | |
| 5,095,736 A | 3/1992 | Fesler et al. | |
| 5,096,667 A | 3/1992 | Fetcenko | |
| 5,247,798 A | 9/1993 | Collard, Jr. | |
| 5,343,361 A * | 8/1994 | Rudy et al. | 361/725 |
| 5,440,294 A | 8/1995 | Mercier et al. | |
| 5,586,438 A | 12/1996 | Fahy | |
| 5,603,376 A | 2/1997 | Hendrix | |
| 5,742,609 A | 4/1998 | Kondrak et al. | |
| 5,876,873 A | 3/1999 | Mattan | |
| 5,981,101 A | 11/1999 | Stone | |
| 6,081,188 A | 6/2000 | Kutlucinar et al. | |
| 6,147,859 A | 11/2000 | Abboud | |
| 6,169,249 B1 * | 1/2001 | Teachout et al. | 174/559 |
| 6,229,438 B1 | 5/2001 | Kutlucinar et al. | |
| 6,233,776 B1 | 5/2001 | Blum et al. | |
| 6,301,103 B1 | 10/2001 | Abboud | |

(Continued)

*Primary Examiner* — Angel R Estrada

(74) *Attorney, Agent, or Firm* — GE Global Patent Operation; John A. Kramer

(57) ABSTRACT

A system is employed to mount an electronic component on a shelf. A first restraining device is associated with a support structure in a first location. The first restraining device is configured to operably engage a mating piece associated with the electronic component. The support structure is configured to guide an electronic component along an axis of insertion when introduced to the shelf. A second restraining device is associated with the support structure in a second location. The second restraining device is configured to secure the electronic component via one or more fastening elements.

27 Claims, 13 Drawing Sheets

(56) References Cited

U.S. PATENT DOCUMENTS

| | | |
|---|---|---|
| 6,392,543 B2 | 5/2002 | Maloney |
| RE37,804 E | 7/2002 | Mattan |
| 6,424,260 B2 | 7/2002 | Maloney |
| 6,450,597 B1 * | 9/2002 | Bell et al. .................. 312/223.1 |
| 6,469,899 B2 * | 10/2002 | Hastings et al. ............. 361/724 |
| 6,501,020 B2 * | 12/2002 | Grant et al. ...................... 174/50 |
| 6,647,301 B1 | 11/2003 | Sederlund et al. |
| 6,649,830 B1 * | 11/2003 | Bartlett et al. ................. 174/50 |
| 6,684,108 B2 | 1/2004 | Surbeck et al. |
| 6,844,058 B2 | 1/2005 | Blum et al. |
| 6,886,209 B2 | 5/2005 | Blum et al. |
| 7,137,820 B1 | 11/2006 | Scranton et al. |
| 7,210,751 B2 * | 5/2007 | Nakayama .................. 312/223.1 |
| 7,332,722 B1 | 2/2008 | Tran et al. |
| 7,486,188 B2 | 2/2009 | Van Alstyne |
| 7,507,732 B2 | 3/2009 | Lefker et al. |
| 7,622,736 B2 | 11/2009 | Moriya et al. |
| 7,714,728 B2 | 5/2010 | Koblasz |
| 7,911,793 B2 * | 3/2011 | Attlesey ......................... 361/715 |
| 7,924,570 B2 * | 4/2011 | Randall et al. ............... 361/724 |
| 8,162,417 B2 * | 4/2012 | Briggs et al. ............... 312/223.2 |

\* cited by examiner

RESTRAINT SYSTEM FOR AN ENERGY STORAGE DEVICE

BACKGROUND

1. Technical Field

Embodiments of the subject matter disclosed herein relate to arrangement of devices within a power system. Other embodiments relate to a restraint system associated with devices within a power system.

2. Discussion of Art

As depicted in prior art FIG. 1, a conventional storage and securement configuration 100 employs one or more straps 118 to secure a battery 110 to a shelf 120 or other support. The straps may be stretched or wrapped around the battery. The straps may be problematic for their intended purpose.

It may be desirable to have a battery restraint system that differs from those that are currently available.

BRIEF DESCRIPTION

In one aspect, a system is employed to mount an electronic component on a shelf. A first restraining device is associated with a support structure in a first location. The first restraining device is configured to operably engage a mating piece associated with the electronic component. The support structure is configured to guide an electronic component along an axis of insertion when introduced to the shelf. A second restraining device associated with the support structure in a second location. The second restraining device is configured to secure the electronic component via one or more fastening elements.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

The subject matter disclosed herein relates to arrangement of devices within a power system, and a restraint system and method associated therewith.

Figure 1:
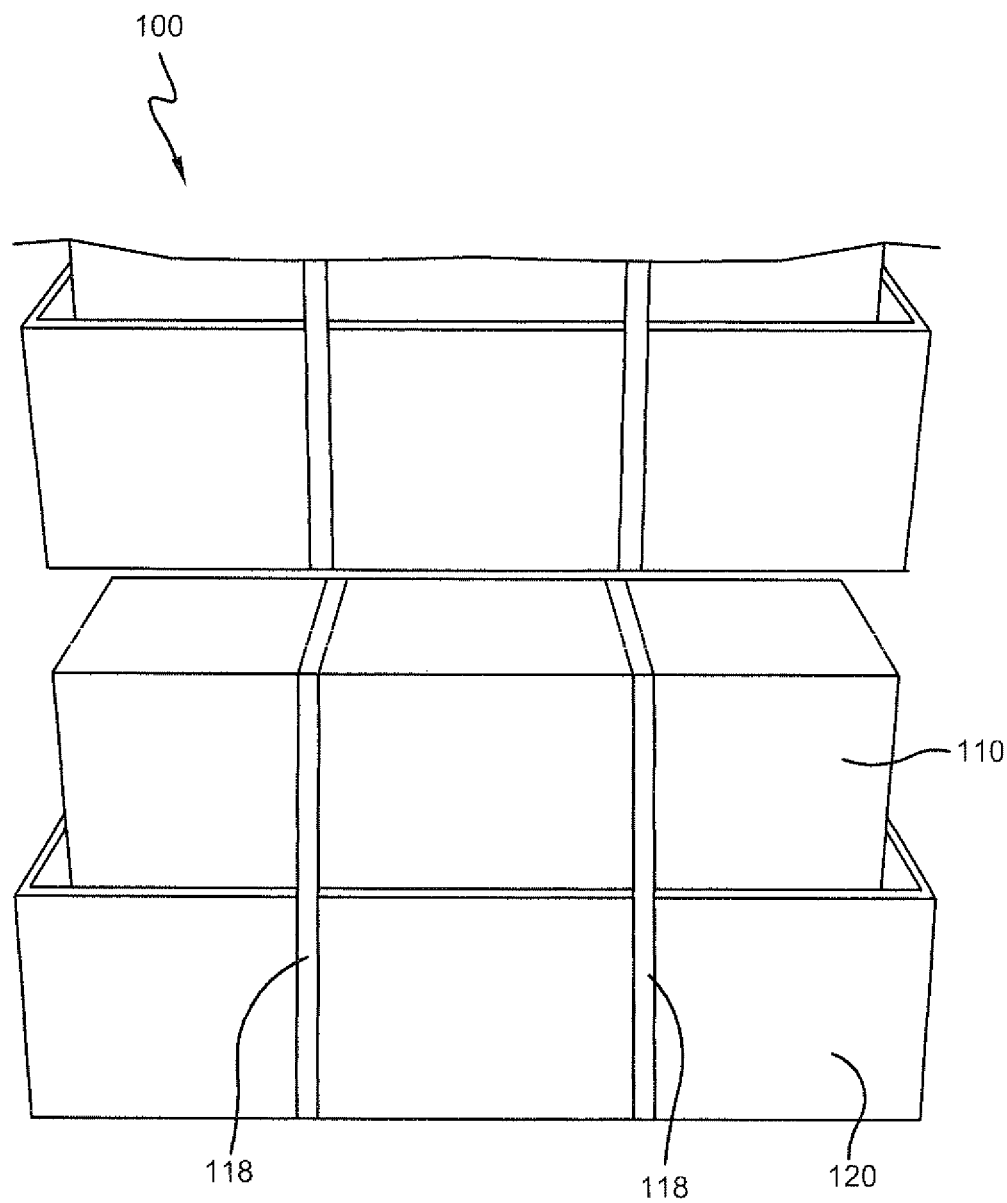
FIG. 1 is a drawing of prior art that depicts conventional securement for battery enclosures in the form of one or more straps.
Figure 2:
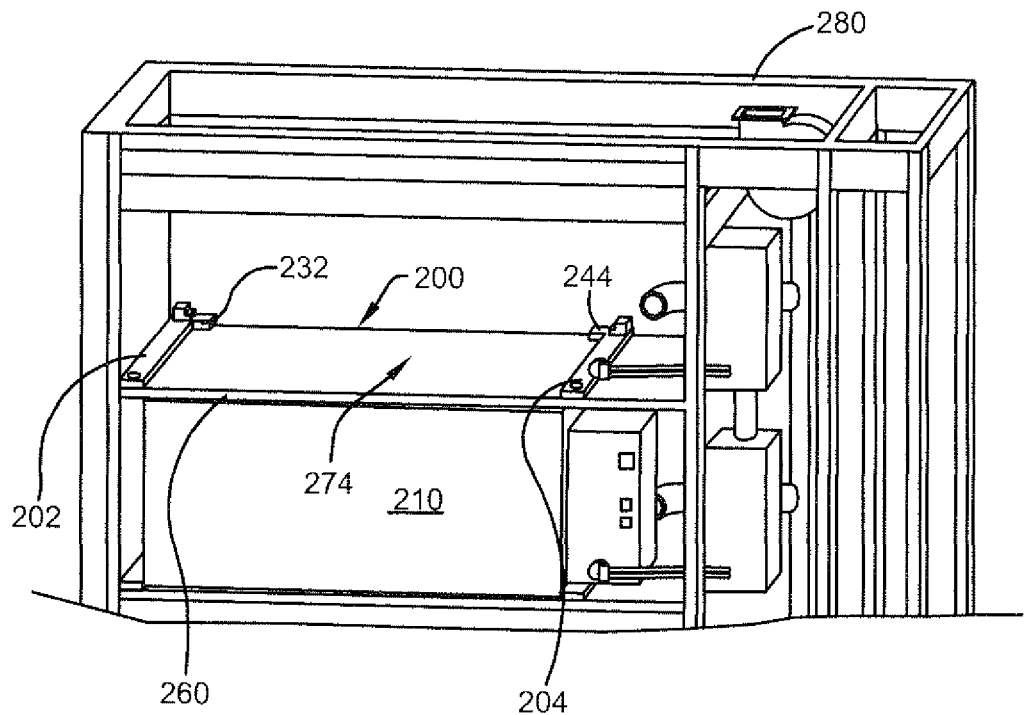
FIG. 2 illustrates a perspective view of an exemplary landing zone within a cabinet to facilitate securement of an electronic component.

Turning to the Figures, various examples of a restraint system depicting aspects and features of the invention are shown. FIG. 2 is a perspective view of a cabinet 280 for mounting at least one electronic component 210, such as an energy storage device or equivalent, with a structure to be referred to as a landing zone 200. The cabinet 280 allows the electronic component 210 to be positioned into the cabinet 280 along an axis of insertion 274 onto a shelf 260. According to one aspect, a "shelf" refers to at least one surface capable of non-transitorily supporting an electronic component. The surface can be associated with a floor, a pedestal, a table, or some other surface employed to support an electronic component. In another aspect, a "suspended shelf unit" is a generally planar, rigid member fixed at an angle to a wall or other vertical surface, for non-transitorily supporting an electronic component.

As described herein, the cabinet 280 may be an enclosure that houses one or more electronic components. These electronic components may be used for power generation, power storage, processing, control, data storage, and like electronic functions. In addition, the cabinet 280 may include one or more shelves that are permanently or intermittently enclosed or open to the surrounding atmosphere. In one example, the cabinet 280 is an enclosure that is enclosed on one or more sides. These sides may be enclosed by a door or other structure that is removably disposed. In another embodiment, instead of a cabinet, the restraint system (e.g., including the landing zone) may be implemented as part of, or otherwise in conjunction with, a rack that is exposed to the surrounding atmosphere. Once placed in the landing zone 200, the electronic component 210 may be secured using aspects of the restraint system. For purposes of this disclosure, the side that is encountered first when placing an electronic component along the axis of insertion 274 is referred to as the front and the side encountered after the first side is referred to as the rear.

The landing zone 200 includes a first support structure 202, which is mounted to the shelf 260 to define a first side of the landing zone 200. Similarly, a second support structure 204 is mounted to the shelf 260 to define a second side of the landing zone 200. In one embodiment, the support structures function both as support and as a guide for insertion. The support structures may be fastened to the shelf. Suitable fastening mechanisms may include a weld, an adhesive, and/or a fastening device such as a screw or rivet. In one aspect, the shelf 260 and support structures 202, 204 are made of metal, alloy, plastic, or other durable material. If the support structures are made of a metal, welding may be utilized to adhere the support structures to the shelf 260, also made of metal. If the support structures are made of a plastic, the support structures may be secured to the shelf 260 via fastening devices such as screws, rivets, plastic welds, adhesives, or the like.

The landing zone 200 has a footprint that is defined on three sides. The inner sides of the support structures 202, 204 define first and second sides, respectively, and rear stopper elements 232, 244 define a third side at the rear of the cabinet 280. The front of the landing zone 200 is open to accommodate placement of an electronic component therein along the axis of insertion 274. The landing zone 200 may be of a size and/or shape footprint to accommodate various devices/components, as appropriate. For instance, the landing zone 200 may be the shape of a parallelogram, a trapezoid, an oval, a square, and the like. The support structures may be shaped to accommodate such disparate size and shape of the landing zone 200. In addition, the placement and size of the rear stopper elements 232, 244 may be selected commensurate with such changes.

To secure the support structures to the shelf, the distance there between is about the same as the width of a desired electronic component. That is, a distance between the support structures is based on the width of an electronic component designated for placement in the landing zone. In this manner, the electronic component may be prevented from shifting along the shelf 260 during transport or other movement to prevent damage thereof. Moreover, the use of the support structure spaced at a desired distance may prohibit the use of noncompliant devices within the cabinet, since such noncompliant devices may have a footprint that is incompatible to the landing zone 200.

Regardless of the size and shape of the landing zone 200, aspects of the invention may facilitate the use of a second restraining device and a first restraining device to secure an electronic component within the landing zone. The number of second restraining devices and first restraining devices may be determined with reference to the intended use and the manufacturability of the devices. Furthermore, the second restraining devices and first restraining devices, and corresponding coupling elements, which accommodate securement of the electronic component, may be located at several points within the landing zone 200 such as at each corner of a cuboid shaped electronic component, surrounding the circumference of a cylindrical shaped device, and the like.

In one example, the second and first restraining devices are fastened to a device to be coupled to the support structures 202, 204. For this purpose, the support structure may include particular features to accommodate fastening devices and/or structures used with the second and first restraining devices. Such features may include dimples, holes, raised elements, etc. that may couple to corresponding elements (e.g., buttons, recesses, holes, and the like) on or proximate to the electronic component.

In an embodiment, when the electronic component 210 is placed along the axis of insertion 274 into the landing zone 200, each second restraining device is positioned on the front of each support structure, such as being integral with, captured, or otherwise secured to corresponding elements on the front of each support structure 202, 204. The second restraining device may be a bracket, metal strap, or other device that may couple the front of the electronic component to the landing zone. Particularly, the second restraining device may be utilized to interface with the front side of the support structure, which may require user interaction such as a turning of a screw, closing of a latch, tightening a strap, etc. Each second restraining device(s) may be attached to the electronic component for movement therewith (for association with a support structure subsequent the electronic component being placed in the landing zone), or it may be associated with the support structure (via attachment to the support structure) independent of the electronic component (for restraining the electronic component subsequent to its placement in the landing zone), or it may be a multi-part element with one part attached to the electronic component and another part attached to the support structure (the two parts engaging, or being engageable to one another, subsequent to the electronic component being placed in the landing zone).

In contrast, the first restraining device may be positioned on the rear of each support structure, such as being integral with, captured, or otherwise secured to corresponding elements on the rear of each support structure 202, 204, which do not require further user interaction. In this manner, an electronic component may be removed from the cabinet 280 without requiring a user to access the rear of the cabinet 280. This may be advantageous for allowing a greater density of electronic components to be stored within a space, since additional space is not required to accommodate user access.

Figure 3:
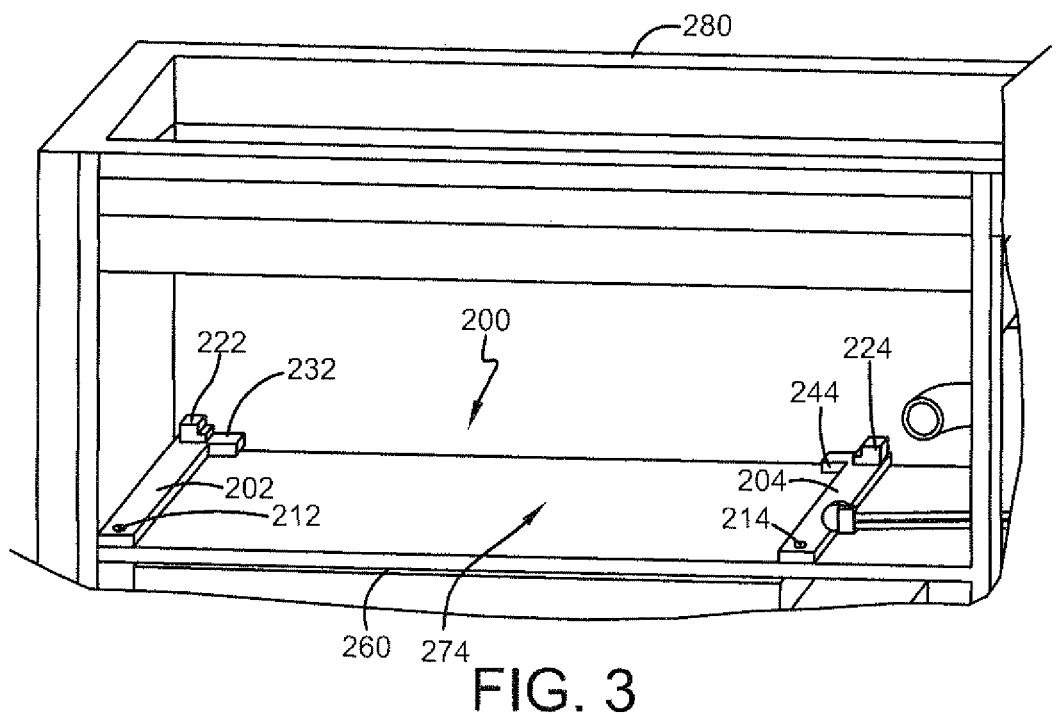
FIG. 3 shows a detail of the landing zone depicted in FIG. 2.

FIG. 3 is a detailed view of the landing zone 200. In this exemplary embodiment, the landing zone 200 includes the first support structure 202 and the second support structure 204 spaced apart at a distance about equal to the width of an electronic component. Rear stopper elements 232, 244 are each disposed at the rear of the landing zone adjacent to the support structures, respectively. Further, in this embodiment, the support structures are in a about parallel configuration in contemplation of a cuboid-shaped electronic component to be disposed therebetween. It is to be appreciated, however, that orientation of the support structures relative to one another and/or any other feature within the cabinet 280 is contemplated within the scope of this invention.

The first support structure 202 includes a front coupling element 212 and a rear coupling element 222. Similarly, the second support structure 204 includes a front coupling element 214 and a rear coupling element 224. The front coupling elements 212, 214 of each support structure may be disposed in a location that is about the same distance from the front edge of the shelf 260. The rear coupling elements 222, 224 may likewise be disposed at about the same location along the respective support structures relative to the front edge of the shelf 260 or any other datum point. The coupling elements may differ from shelf to shelf, cabinet to cabinet, or any variation as desired.

Figure 4:
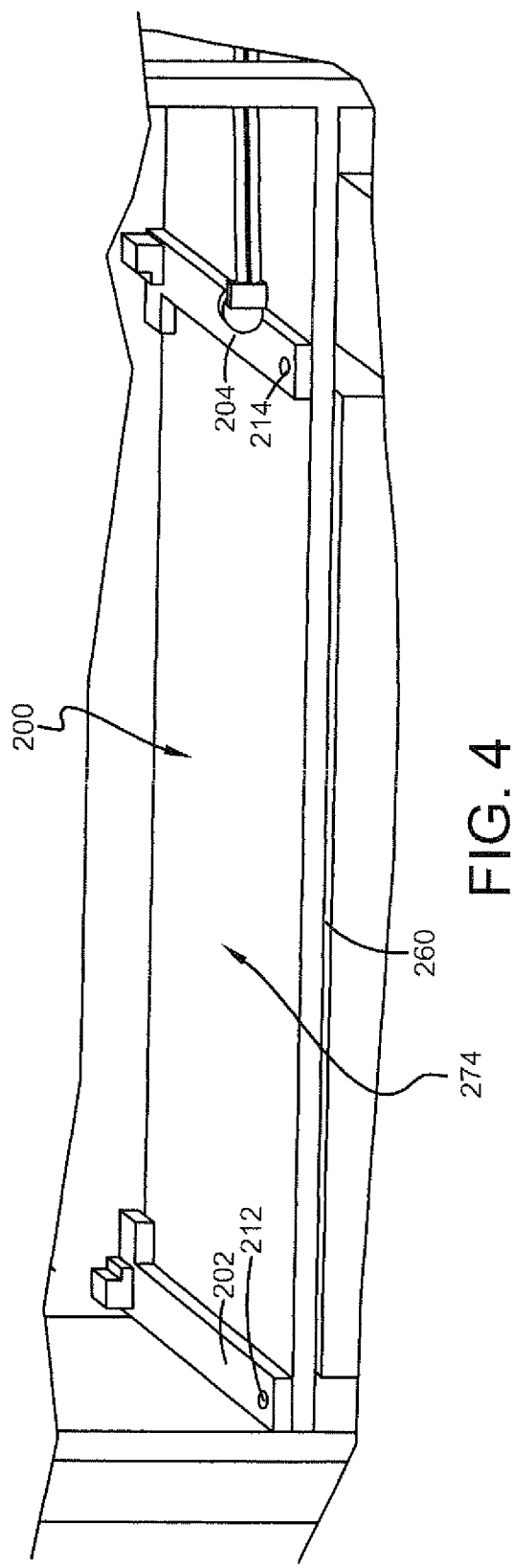
FIG. 4 shows a detail of holes placed into mounting rails that form either side of the landing zone.

FIG. 4 illustrates an exemplary embodiment of the front coupling elements 212, 214 that are utilized for securement of a second restraining device (not shown) within the landing zone 200. The second restraining device may secure a front side of an electronic component to the support structures. In this example, the front coupling elements 212, 214 are holes configured to receive a screw, rivet, or other fastening device. The holes may be threaded as necessary to accommodate the particular fastening device utilized. In this manner, the second restraining device may be secured to the support structure via the front coupling elements 212, 214.

Figure 5:
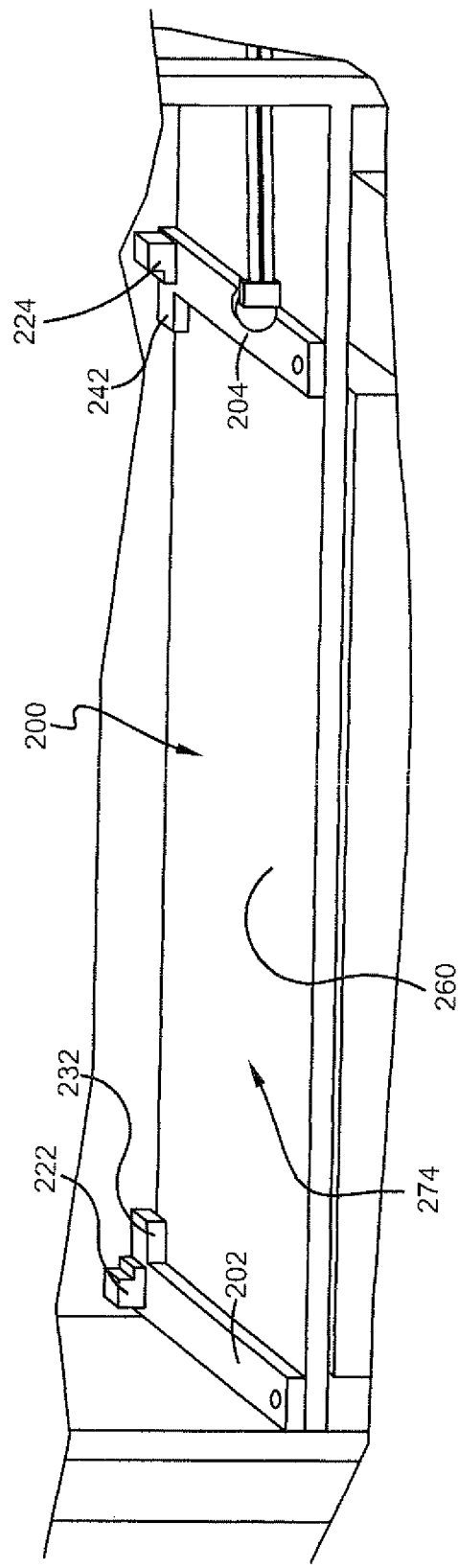
FIG. 5 shows rear brackets and rear stoppers that are used in the rear portion of the landing zone.

FIG. 5 illustrates exemplary embodiments of the rear coupling elements 222, 224 which are disposed toward the rear of the landing zone 200. In this embodiment, the rear coupling elements 222, 224 are brackets that are mounted onto the support structures 202, 204, respectively. The rear coupling elements 222, 224 may facilitate securement of corresponding first restraining devices that are configured to secure the rear side of the electronic component within the landing zone 200. In one example, the first restraining device and the rear coupling element are configured to be mechanically mated to one another, but may be integral with one another or otherwise suitably positioned together. It is specifically contemplated that the rear restraining system (e.g., rear coupling elements 222, 224 and first restraining devices) requires a minimal amount of interaction between a user and the rear restraining system such that access to the rear restraining system is unnecessary. The rear restraining system may include any number, size and shape components for this purpose including various geometric pairings that provide suitable coupling and/or mating that may be removably engaged.

As will be described hereafter, in an embodiment, each first restraining device comprises a wedge-shaped rear restraining device. As described herein, a wedge-shape relates to an inclined slot or void (e.g., female member) that accommodates a wedge-shaped structure (e.g., male member) that is coupled to the electronic component. In this manner, a degree of engagement of the electronic component to the support structure increases as the electronic component is moved along the axis of insertion from a first position further away from the shelf to a second position closer to the shelf.

The rear coupling elements 222, 224 are configured to respectively receive the wedge-shaped rear restraining devices for insertion thereof. The rear coupling elements 222, 224 may be configured to receive the rear restraining devices inserted along the axis of insertion 274. In this manner, rear restraining devices may be simply inserted into and removed from each rear coupling element 222, 224. Moreover, the use of wedge-shaped rear restraining devices in association with the rear coupling elements 222, 224 may provide a stable and secure restraint, which is strengthened as a user further inserts the electronic component into the landing zone 200 along the insertion direction.

Figure 6:
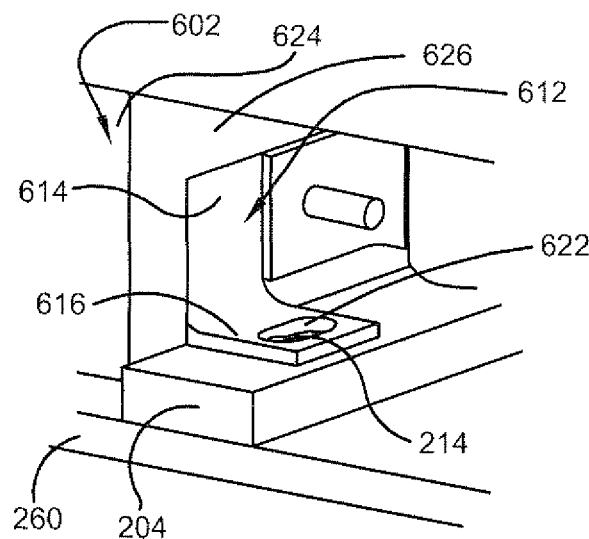
FIG. 6 illustrates an exemplary second restraining device system used in conjunction with the front holes of the landing zone.
Figure 7:
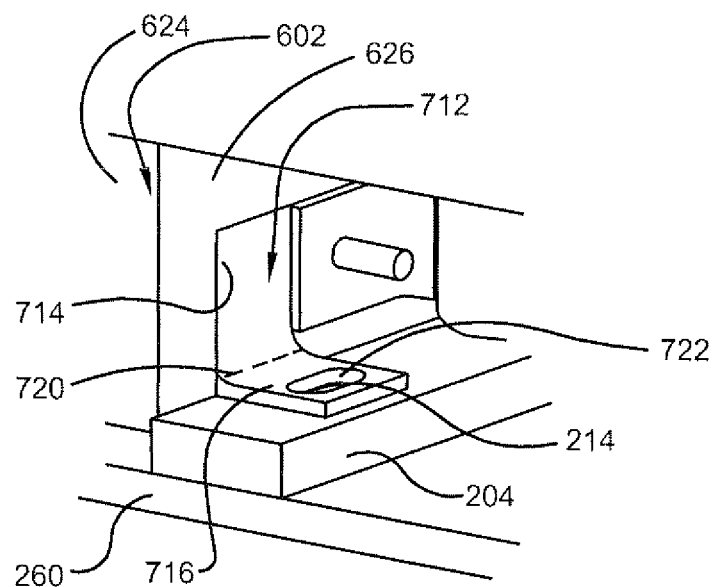
FIG. 7 depicts another exemplary second restraining device in the form of a hinged bracket to use in conjunction with the front holes of the landing zone.
Figure 8:
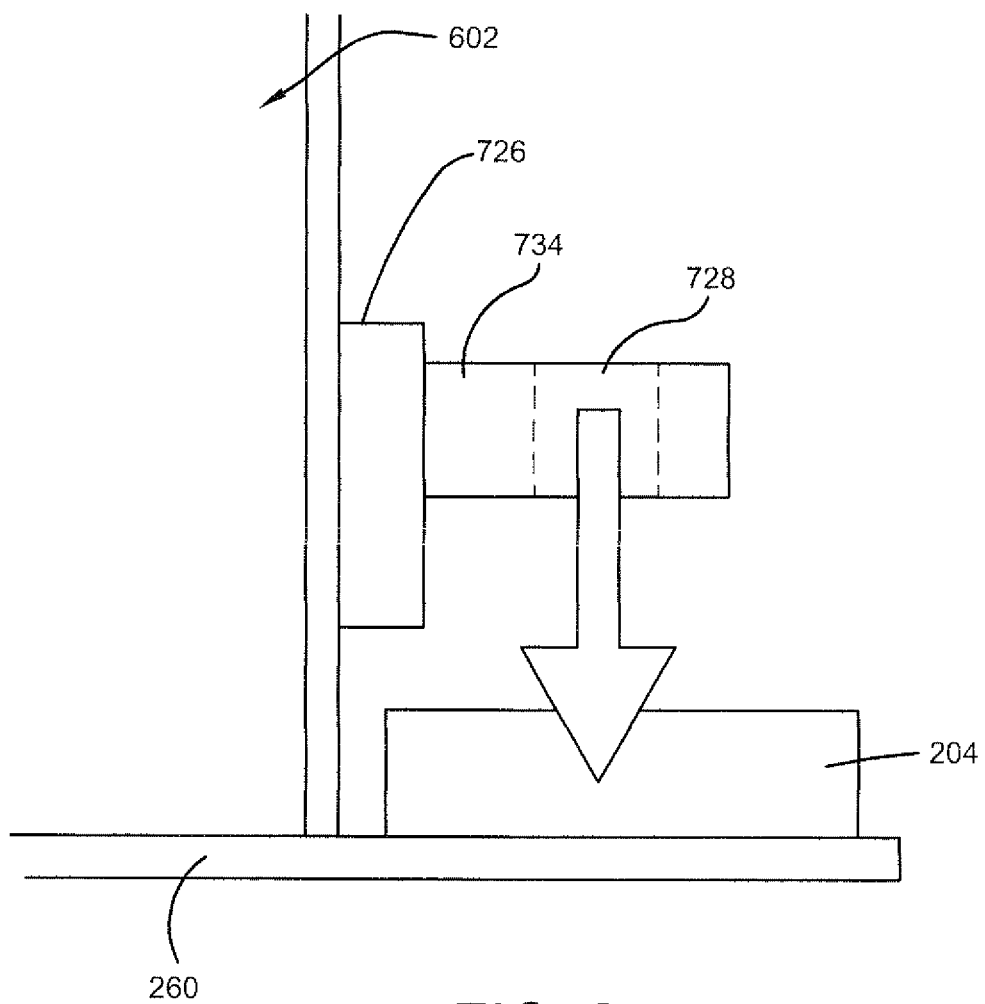
FIG. 8 illustrates another exemplary second restraining device in the form of a slotted, recessed structure in which a perpendicular member may be placed for securement to the front holes of the landing zone.
Figure 9:
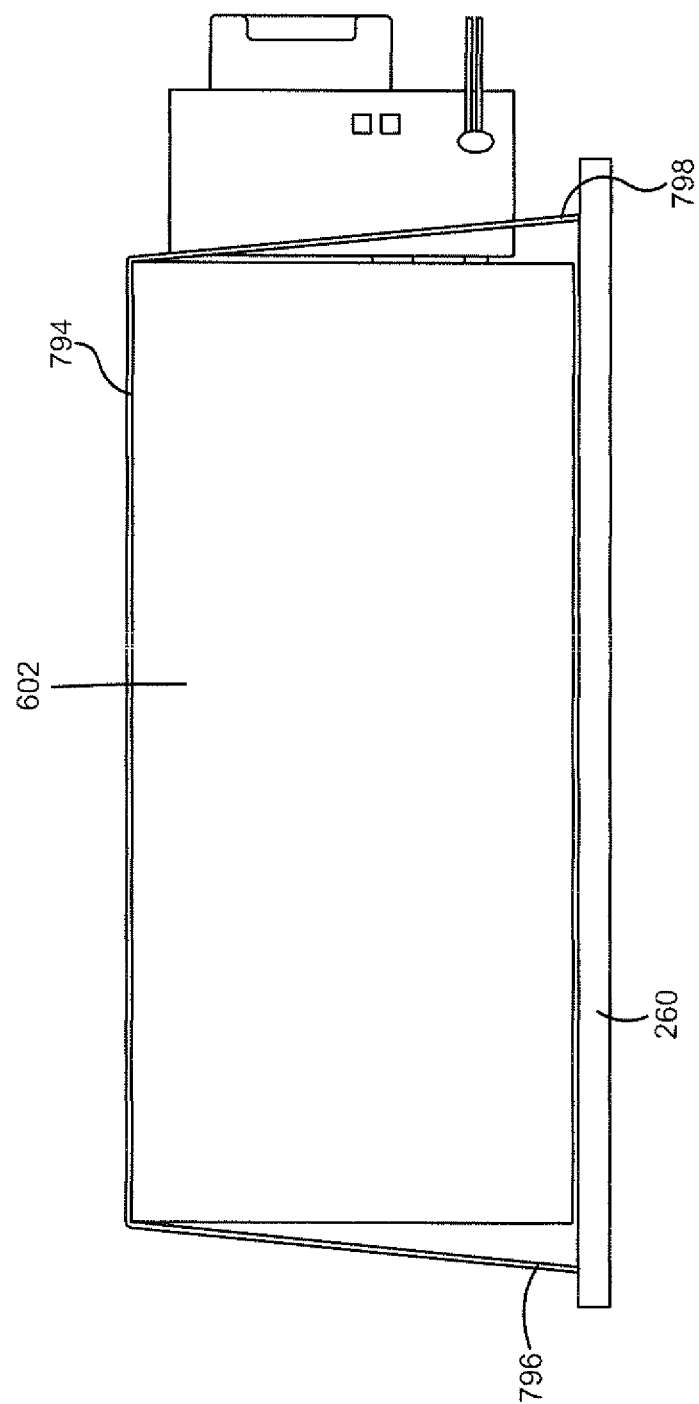
FIG. 9 illustrates another exemplary embodiment of a second restraining device that may be utilized with the landing zone.

FIGS. 6 through 9 illustrate exemplary embodiments for various second restraining devices, which provide securement of an electronic component within the landing zone 200 via the front coupling elements 212, 214. More particularly, FIG. 6 shows an L-bracket, FIG. 7 shows a hinged L-bracket, FIG. 8 shows a recessed foot, and FIG. 9 shows a strap. Each of these exemplary second restraining devices may provide securement of an electronic component utilizing various systems and methods suitable to each device. Other restraining devices in association with front coupling elements 212, 214 are contemplated.

FIG. 6 illustrates a first exemplary second restraining device as an L-bracket 612, which is utilized to couple an electronic component 602 to the support structure 204 via the front coupling elements 212, 214. In one embodiment, another L-bracket 612 is also utilized to secure an electronic component 602 to the support structure 202, which may be a symmetric mirror image of the L-bracket 612 shown in FIG. 6. A description of each example related to a one side of the landing zone 200 has a symmetric counterpart, which is a mirror image on the other side of the landing zone 200. Further, the electronic component 602 includes a front face 624 and a side face 626. In this example, the front face 624 is adjacent to and aligned with the front edge of the shelf 260, while the side face 626 is about perpendicular to the front face 624 and parallel and adjacent to the support structure 204. It is to be appreciated that a side face on the opposite side of the landing zone is a mirror image of the same.

The L-bracket 612 includes an upper element 614 and a lower element 616, which are disposed to each other in a perpendicular fashion. In one embodiment, the upper element 614 and the lower element 616 are formed from a unitary material that is created via stamping, bending, casting, molding, etc. In another embodiment, the upper element 614 and the lower element 616 are separate pieces that are fastened together (e.g., via welding, brazing, and the like). The upper element 614 is secured to the electronic component 602 via known fastening methods such as the use of an adhesive, welding, mechanically fastened, etc., to suitably secure the second restraining device to the electronic component 602.

The lower element 616 is unsecured and left to protrude from a sidewall of the electronic component 602. The lower element 616 further includes a slot 622 that is configured to rest upon and/or lay over the front coupling element 214 to facilitate securement thereto. In one example, a fastening device is placed through the slot 622 into the front coupling element 214. Continuing the example, a screw with a suitable head is screwed into the front coupling element 214 as a threaded hole wherein the screw head applies adequate pressure to the lower element 616 to couple the L-bracket 612 to the support structure 204.

FIG. 7 illustrates a second exemplary second restraining device as a hinged L-bracket 712. The hinged L-bracket 712 includes an upper element 714, a lower element 716, and a hinge 720. As discussed above with regard to the L-bracket 612, the upper element 714 may be adhered or otherwise attached to the side face 626. In addition, the lower element 716 may have a slot 722 to accommodate a fastening device to couple the hinged L-bracket 712 to the front coupling element 214. The hinged L-bracket 712 may be secured to the support structure 204 as discussed above with regard to the L-bracket 612. One difference between the restraining device 612 and the restraining device 712 is the addition of the hinge 720, which may facilitate the retraction of the lower element 716 in an upward direction such that it is about adjacent the upper element 714 attached to the side face 626. In this manner, the hinged L-bracket 712 may be stored for future use without protrusions that may encumber such subsequent storage and/or retrieval of the electronic component 602.

FIG. 8 illustrates a third exemplary embodiment of the second restraining device as a recessed front foot 726, which is configured to accommodate a clamp rig 734 therein. The clamp rig 734 may include a slot 728 to mate the clamp rig 734 to the support structure 204. In this embodiment, the clamp rig 734 may be disengaged from the recessed front foot 726 prior to insertion into the landing zone 200. The clamp rig 734 may then be placed into the recessed front foot 726 once the fastening element (not shown) is used to couple the clamp rig 734 to the support structure 204 via the coupling element 214. Alternatively, the clamp rig 734 could be secured to the rail 204 in any other suitable manner, in association with coupling element 214 or separately. The clamp rig 734 may also be removed for storage to facilitate safety.

FIG. 9 shows a further exemplary embodiment utilizing a strap 794 as a second restraining device that is fastened to the front coupling elements 212, 214 via strap holds 796 and 798 respectively. The strap holds 796, 798 may comprise any fastening mechanism that facilitates the coupling of the strap 794 to the support structure. In one embodiment, the strap holds 796, 798 are threaded fasteners that insert into the front coupling elements 212, 214. The strap 794 may be made of a thin, flexible and/or malleable metal, plastic, or other suitable material to allow flexibility to bend around the electronic component 602. In one embodiment, the electronic component 602 is a battery with a rectangular shape, wherein the strap is about fitted around the corners of the side faces as they intersect to a top face. The strap 794 may be removed via a release mechanism (not shown) to quickly change out the electronic component 602 within the shelf 260.

The first restraining devices are disposed toward the rear of the landing zone and are used with the second restraining devices, discussed above, to facilitate comprehensive restraint of the electronic component within the cabinet. In one embodiment, the first restraining devices include a pair of structures that may be mounted to the exterior of the electronic component 602. The first restraining devices may fulfill an additional requirement over the second restraining devices in that access to the rear area of the landing zone 200 may be problematic. Accordingly automatic engagement and disengagement of the first restraining devices may be desirable. Exemplary first restraining devices are set forth in FIGS. 10, 11, and 12 below.

Figure 10:
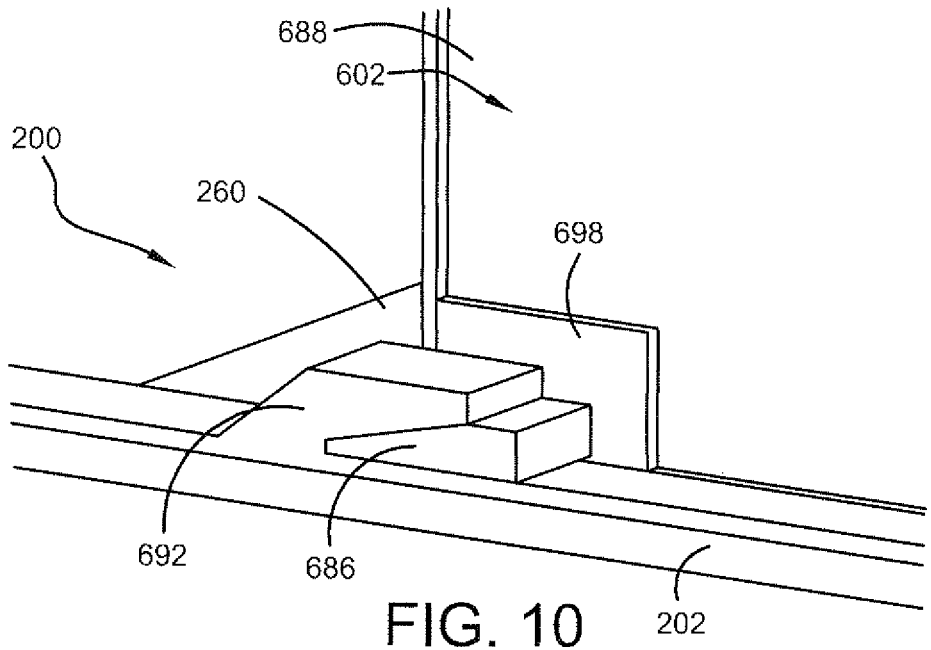
FIG. 10 illustrates a first restraining device in the form of a wedge that couples to a complimentary bracket on a rear portion of the landing zone.

FIG. 10 illustrates a first exemplary embodiment of a first restraining device that includes a first mating piece 692 which is integral to or mounted to the support structure 202. The first mating piece 692 may create a void of a suitable shape to accommodate a second mating piece 686 for insertion and removal thereof. In this manner the second mating piece can be inserted into the void without additional user access to the rear of the landing zone 200. The second mating piece 686 may protrude from a mount plate 698 that couples the second mating piece to the side face 688 of the electronic component 602. In this example, the first mating piece 692 is a bracket that creates a void in the shape of a wedge wherein the second mating piece 686 is the complimentary wedge shape to fill the void created. The first mating piece 692 may be coupled to the support structure 202 by welding, casting, fastening element, or formed integrally therewith. The coupling method may be determined by application specific parameters.

The auto-engagement between a first mating piece and a second mating piece may be versatile. The auto-engagement may allow the loading and unloading of the electronic component 602 in a restrained condition into and out of the landing zone 200 with little or no user intervention. A locking mechanism, or other engagement, may be utilized to secure the second mating piece 686 within the first mating piece 692, wherein a mechanical motion such as a push inward may release the mechanism and allow removal of the second mating piece 686 from the first mating piece 692. It is to be appreciated that although the exemplary embodiments related to the first mating piece 692 and second mating piece 686 are shown on the first support structure 202, the same or similar type of first restraining device may be employed as a symmetrical mirror image as it relates to the second support structure 204.

Figure 11:
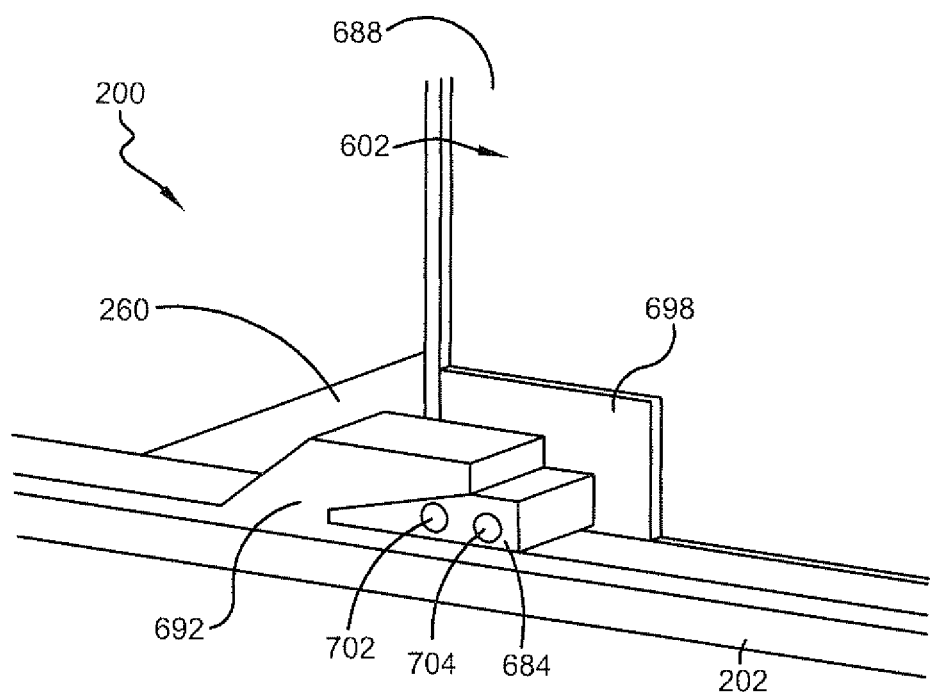
FIG. 11 illustrates another exemplary first restraining device, wherein the wedge bracket is removably secured to the electronic component.

FIG. 11 illustrates the first mating piece 692 engaged to a removable second mating piece 684. The removable second mating piece utilizes one or more fastening components 702, 704 to removably secure the second mating piece 684 to the mount plate 698 and/or the electronic component 602. In one embodiment, the fastening elements 702, 704 are bolts or screws that allow the second mating piece to secure to the mount plate 698. A further exemplary embodiment of the rear restraining system depicted in FIGS. 10 and 11 may utilize a specialized surface on the first mating piece 692 or second mating piece 686, 684 such as a rubber grip, galvanically compatible metal, or other apparatus to provide additional support and stability within the first restraining device. In a further example, the first mating piece 692 is formed by cutting a portion of the support structure 202 and pulling the tab up to form the first mating piece and void associated therewith. The first mating piece and the second mating piece may be created such that they are capable of engagement and release.

Figure 12:
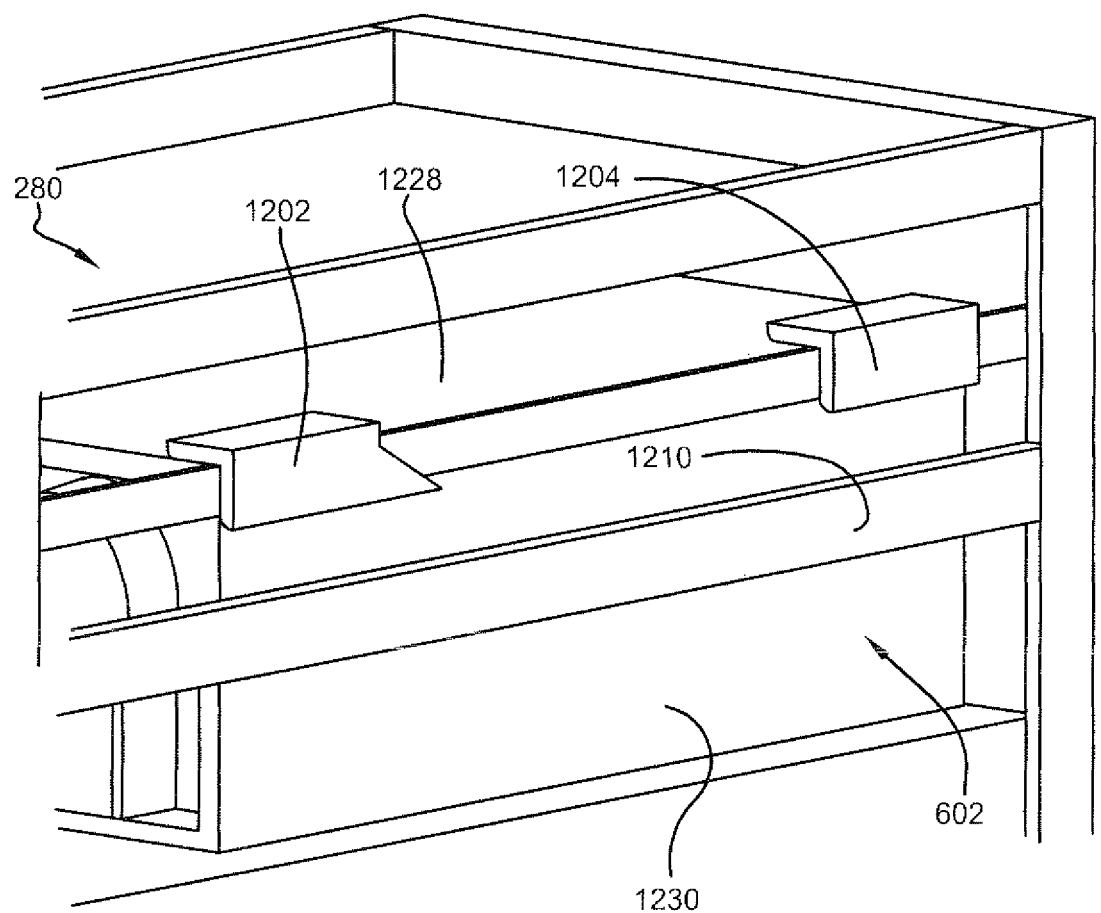
FIG. 12 illustrates another exemplary embodiment of a first restraining device in the form of one or more brackets located at the top rear of the landing zone.

FIG. 12 illustrates yet another exemplary embodiment of the rear restraining system that employs brackets 1202, 1204 that are mounted to a rear brace 1210 of the cabinet 280. In this embodiment, one or more brackets may be employed and mounted to the rear brace 1210 to engage a top rear corner of the electronic component 602. The top rear corner may refer to the intersection of a top face 1228 with a rear face 1230 wherein the bracket may suitably accommodate the angle of intersection between the faces 1128 and 1230.

In one example, the electronic component 602 is cuboid wherein the top face 1228 and the rear face 1230 are about perpendicular to each other. Accordingly, the brackets 1202 and 1204 may consist of L-brackets which suitably mate to the corner of the electronic component 602 to provide securement thereof. It is noted that the use of the brackets may not require intervention by a user to provide such securement. A further embodiment of this exemplar may utilize an engaging element on the top face 1228 in one or more locations to mate to a corresponding divot within the brackets. The brackets may be mounted to the rear brace using any suitable method such as welding, or fastening devices.

Figure 13:
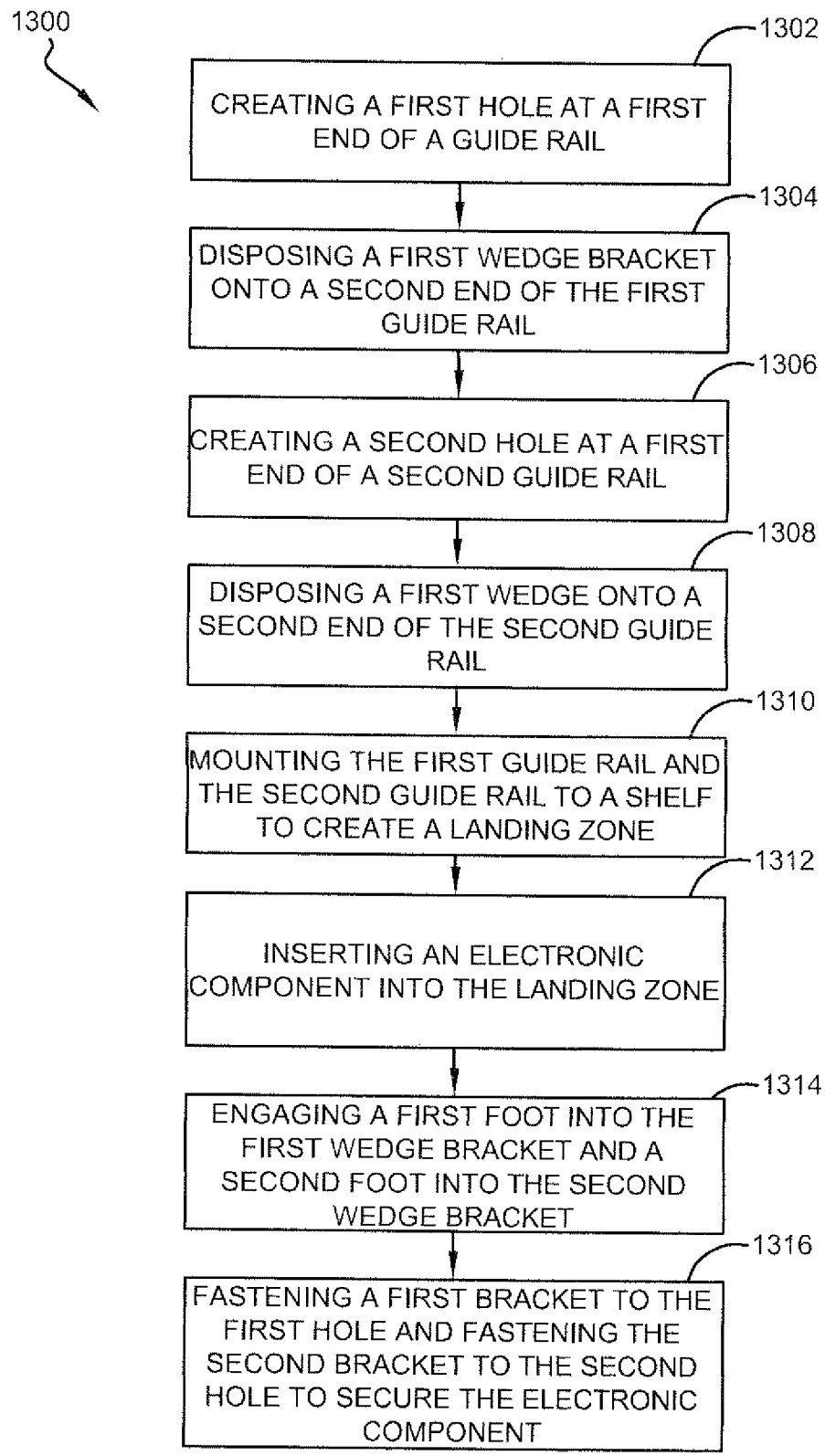
FIG. 13 illustrates a methodology for the creation of a landing zone and securement of an electronic component secured therein.

FIG. 13 illustrates a methodology that may be utilized to create a landing zone to accommodate an electronic component on a shelf within a cabinet. In a first step at 1302, a first hole is created at a first end of a first support structure. A first wedge bracket is disposed onto a second end of the first support structure at 1304. A second hole is created at 1306 at a first end of a second support structure and, at 1308, a second wedge bracket is disposed onto a second end of the second support structure. The first and second wedge bracket may be created any number of ways such as via mounting an external component or modifying the structure of the respective support structures.

At 1310, the first support structure and the second support structure are both mounted to a shelf to create a landing zone, wherein an electronic component is inserted therein at 1312. A first foot, mounted to the electronic component, and a second foot, mounted to the electronic component, are both engaged into corresponding wedge brackets adjacent the landing zone. At 1316, a first bracket is fastened to the first hole and the second bracket is fastened to the second hole to secure the electronic component. It is to be appreciated, however, that a front and rear coupling elements described within the methodology 1300 are exemplary and about any coupling element may be employed for both the front and first restraining devices.

Figure 14:
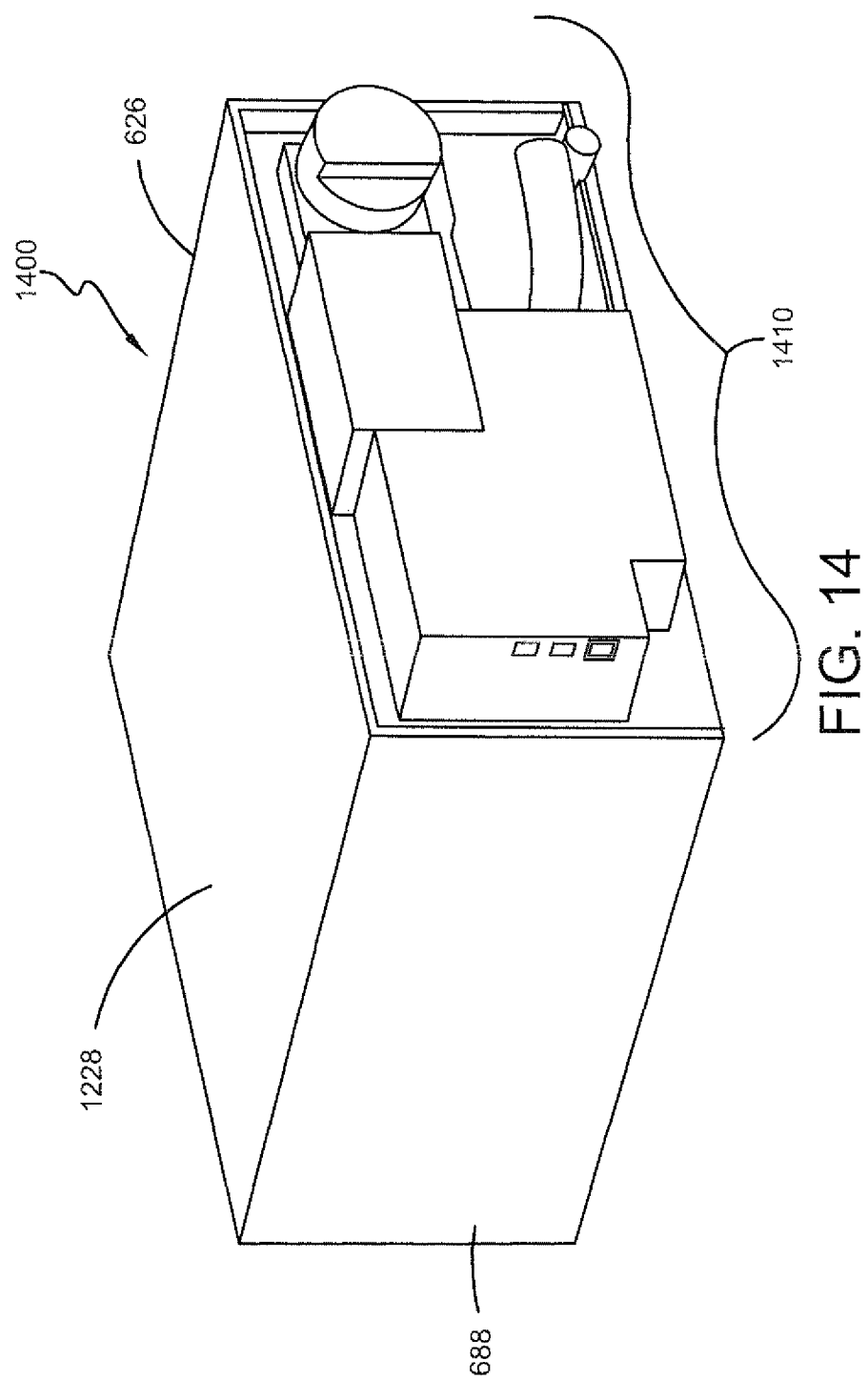
FIG. 14 illustrates an exemplary electronic component that may be employed with the subject landing zone.

FIG. 14 illustrates an electronic component 1400 that is about in the shape of a cuboid with the top face 1228, the side face 626, and the side face 688 as discussed above. A control apparatus 1410 is coupled to the electronic component 1400 that is toward the front face of the electronic component 602 adjacent the door of the cabinet 280 to facilitate easy access thereof. The front and first restraining devices may be mounted to the side faces 626 and 688 at about the same location relative to one another on either face. In this manner, the cuboid-shaped (or any other shape) electronic component 1400 may be inserted and removed from the landing zone without difficulty.

Figure 15:
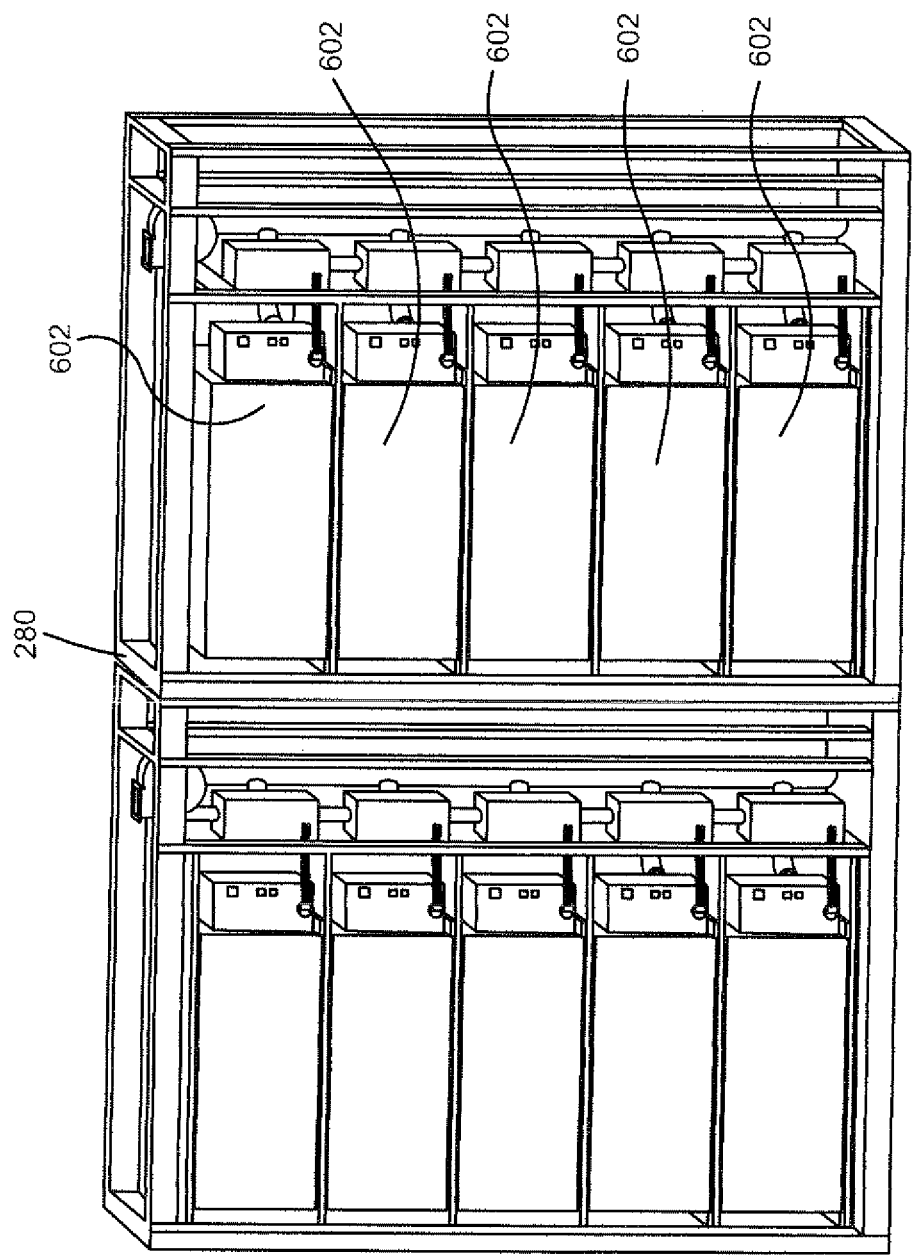
FIG. 15 illustrates a cabinet for storage of a plurality of electronic components, wherein each electronic component is secured via the subject landing zone.

FIG. 15 illustrates the cabinet 280 storing a plurality of electronic components 602 in a tightly packed configuration utilizing the front and first restraining devices described herein. The use of the front and first restraining devices may allow a control house or a systems builder to manufacture and assemble components for the electronic component 602 which may then be preloaded into the cabinet 280. The preloaded cabinet 280 may be transported to a customer in a about complete condition wherein power and other necessary utilities may be coupled thereto to facilitate fast installation. In one example, the cabinet 280 and the electronic component 602 are part of an uninterruptible power supply system, wherein the electronic components 602 each comprise one or more battery cells or other energy storage devices. Continuing the example, each electronic component 602 may be a liquid sodium battery that operates at an elevated temperature for a period of time to provide power as a replacement for power delivered by the grid. The electronic component may be representative of a component that is used for signal processing, power generation, or any other suitable application.

Figure 16:
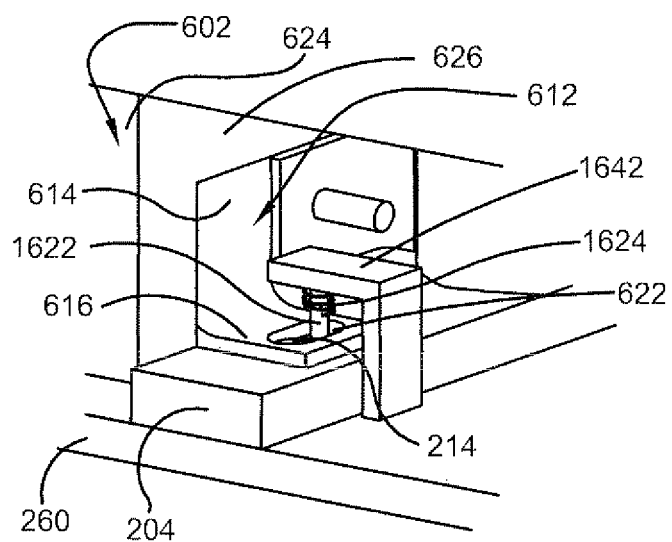
FIG. 16 illustrates an exemplary second restraining device system used in conjunction with the front holes of the landing zone.

FIG. 16 illustrates a perspective view of an exemplary embodiment of the second restraining device, which utilizes an automatic capture mechanism. In this embodiment, a bracket 1642 is mounted, coupled, or otherwise affixed to the support structure 204. The bracket 1642 holds a pin 1622, which includes an elastic component 1624. The elastic component 1624 may be a spring or other device that allows the pin 1622 to move upon application of force. Such movement may create a gap between the pin 1622 and the slot 214 to allow the lower element 616 of the bracket 612 to be inserted. The front side of the pin 1622 may include a chamfer or other feature to facilitate insertion and removal of the enclosure 602 therefrom.

In operation, in an embodiment, the electronic component 602 is inserted onto the shelf 260 wherein the electronic component 602 is automatically captured via the rear coupling elements 222, 224 as described above. At around the same time, the bracket 612 is slid under the bracket 1642 to push the pin 1622 in a vertical direction, which is about perpendicular to the axis of insertion. Upon engagement of the bracket with the pin 1622 via the front edge of the lower element 616, the pin 1622 retracts as the spring element 622 is compressed, deformed, or otherwise modified to allow the pin to move up and engage the slot 214 subsequently. In this manner, the system described in FIG. 16 may allow the automatic engagement of both the rear coupling elements and front coupling elements upon insertion of the electronic component 602 onto the shelf 260. Upon removal of the electronic component 602, the pin 624 may similarly move via the elastic component 1624 to move about upwardly and/or to the side to allow the lower element 616 to be removed as the slot is pulled out of the shelf 260.

In a particular embodiment, first and second support structures define an area for placement of an electronic component. First restraining devices are respectively associated with rear ends of the first and second support structures. Second restraining devices are respectively associated with front ends of the first and second support structures. Structures are mounted to a rear end of the electronic component to operably engage mating pieces associated with the first restraining devices. Brackets or other structures are mounted to a front end of the electronic component for placement proximate to the second restraining devices. In this manner, a fastening element can be employed to couple the brackets to respective second restraining devices.

Another embodiment relates to a system to mount an electronic component on a shelf or other surface. The system comprises a first restraining device, a second restraining device, and a support structure. The first restraining device is associated with the support structure in a first location. The first restraining device is configured to operably engage a mating piece associated with the electronic component towards a rear of the electronic component. The support structure is configured to guide the electronic component along an axis of insertion when introduced to the shelf. The second restraining device is associated with the support structure in a second location. The second restraining device is configured to secure the electronic component via one or more fastening elements towards a front of the electronic component. The electronic component has a front and a rear, the rear is the side of the electronic component inserted first towards/past the support structure, and the front is the side opposite the rear. The electronic component has a longitudinal axis along (parallel to) the axis of insertion, and a middle lateral axis, perpendicular to the longitudinal axis, and positioned at the midpoint of the electronic component along the longitudinal axis. "Towards a front" means at or between the front of the electronic component and the middle lateral axis. "Towards a rear" means at or between the rear of the electronic component and the middle lateral axis.

Another embodiment relates to a system to mount an electronic component on a shelf or other surface. The system comprises one or more first restraining devices, one or more second restraining devices, and a support structure having a first support structure element and a second support structure element. The first and second support structure elements are positioned parallel to one another and spaced apart on the shelf or other surface to define a placement area for placement of the electronic component. The one or more first restraining devices are respectively associated with the first and second support structure elements in a respective first location of each. The one or more first restraining devices are configured to operably engage respective mating pieces associated with the electronic component towards a rear of the electronic component. The support structure elements are configured to guide the electronic component along an axis of insertion when introduced to the shelf or other surface for placement in the placement area. The one or more second restraining devices are respectively associated with the support structure elements in a respective second location of each. The one or more second restraining devices are configured to secure the electronic component via one or more fastening elements towards a front of the electronic component. The electronic component has a front and a rear; the rear is the side of the electronic component inserted first towards/past the support structure, and the front is the side opposite the rear. The electronic component has a longitudinal axis along (parallel to) the axis of insertion, and a middle lateral axis, perpendicular to the longitudinal axis, and positioned at the midpoint of the electronic component along the longitudinal axis. "Towards a front" means at or between the front of the electronic component and the middle lateral axis. "Towards a rear" means at or between the rear of the electronic component and the middle lateral axis.

Another embodiment relates to a method of securing a battery or other electronic component into a cabinet or rack. The method comprises sliding the battery or other electronic component onto a shell within an interior volume of the cabinet or rack. The method further comprises automatically guiding the battery or other electronic component along an axis of insertion as the battery or other electronic component is slid onto the shelf. The method further comprises automatically engaging an area towards a rear of the battery or other electronic component with one or more first restraining devices. The method further comprises engaging an area towards a front of the battery or other electronic component with one or more second restraining devices. The battery or other electronic component has a front and a rear; the rear is the side of the battery or other electronic component inserted first into the cabinet or rack onto the shelf, and the front is the side opposite the rear. The battery or other electronic component has a longitudinal axis along (parallel to) the axis of insertion, and a middle lateral axis, perpendicular to the longitudinal axis, and positioned at the midpoint of the battery or other electronic component along the longitudinal axis.

"Towards a front" means at or between the front of the battery or other electronic component and the middle lateral axis. "Towards a rear" means at or between the rear of the battery or other electronic component and the middle lateral axis. "Automatically" means the stated function is not carried out by human action.

Another embodiment relates to a method of securing a battery or other electronic component into a cabinet or rack. The method comprises sliding the battery onto a shelf within an interior volume of the cabinet or rack. The method further comprises automatically guiding the battery along an axis of insertion as the battery is slid onto the shelf. The method further comprises automatically engaging one or more mating pieces associated with a first side of the battery with one or more corresponding first restraining devices. The method further comprises placing one or more brackets associated with a second side of the battery proximate to one or more corresponding second restraining devices. "Automatically" means the stated function is not carried out by human action.

This written description uses examples to disclose the invention, including the best mode, and also to enable a person of ordinary skill in the art to practice the invention, including making and using any devices or systems and performing any incorporated methods. The patentable scope of the invention is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system to mount an electronic component on a shelf, comprising:
    a first restraining device associated with a support structure in a first location, the first restraining device configured to operably engage a mating piece associated with the electronic component, and the support structure configured to guide the electronic component along an axis of insertion when introduced to the shelf; and
    a second restraining device associated with the support structure in a second location, the second restraining device configured to secure the electronic component via one or more fastening elements.

2. The system according to claim 1, wherein the first restraining device automatically secures the electronic component in response to an insertion of the electronic component into the shelf along the axis of insertion.

3. The system according to claim 1, wherein the first restraining device is a structure with an inclined slot to accommodate a wedge-shaped structure associated with the electronic component as the electronic component is inserted into the shelf.

4. The system according to claim 3, wherein at least one of the wedge-shaped structure and the structure with the inclined slot includes a rubber grip surface.

5. The system according to claim 4, wherein the wedge-shaped structure comprises a metal that is galvanically compatible with the structure with the inclined slot.

6. The system according to claim 1, wherein the second restraining device further comprises a first bracket disposed on a first face and a second bracket disposed on a second face, wherein the first bracket and the second bracket couple the electronic component to the support structure.

7. The system according to claim 6, wherein each of the first bracket and the second bracket is hinged, removable, or pivotally secured and is operable to move to a stowed configuration or location when the electronic component is not positioned in the cabinet.

8. The system according to claim 6, wherein each of the first bracket and the second bracket has a respective slot that aligns with a respective aperture defined by the support structure to secure the electronic component to the support structure.

9. The system according to claim 1, wherein at least one of the first and second restraining devices is electrically grounded and provides the electronic component a path to ground.

10. The system according to claim 1, wherein the electronic component is an energy storage device.

11. The system according to claim 1, wherein the first restraining device prevents movement of the electronic component in every direction except reverse of an insertion direction.

12. The system according to claim 1, wherein a degree of engagement of the electronic component to the support structure increases as the electronic component is moved along the axis of insertion from a first position further away from the shelf to a second position closer to the shelf.

13. The system according to claim 1, wherein the first restraining device is attached to the support structure or is formed integral thereto.

14. The system according to claim 1, further comprising a rear stopper element, which is proximate the first restraining device.

15. A method of securing an electronic component into a cabinet or rack, comprising:
    sliding the electronic component onto a shelf within an interior volume of the cabinet or rack;
    guiding the electronic component along an axis of insertion as the electronic component is slid onto the shelf;
    engaging one or more mating pieces associated with a first side of the electronic component with one or more corresponding first restraining devices; and
    placing one or more brackets associated with a second side of the electronic component proximate to one or more corresponding second restraining devices.

16. The method according to claim 15, wherein a degree of engagement of the electronic component to the first restraining devices increases as the electronic component is moved along the axis of insertion from a first position further away from the shelf to a second position closer to the shelf.

17. The method according to claim 15, wherein each of the one or more mating pieces is a wedge, and wherein each of the one or more corresponding first restraining devices is a structure having a slot which engages a respective one of the wedges on the electronic component.

18. A method of creating a landing zone for an electronic component, comprising:
    providing a first front coupling device at a first end of a first support structure;
    providing a first wedge bracket at a second end, distal to the first end, of the first support structure;
    providing a second front coupling device at a first end of a second support structure;
    providing a second wedge bracket at a second end, distal the first end, of the second support structure; and
    mounting the first support structure and the second support structure to a shelf, in spaced apart relationship.

19. The method according to claim 18, further comprising:
    mounting a first bracket to a first face of the electronic component; and mounting a second bracket to a second face of the electronic component, the second face is opposite the first face, wherein the first and second brackets are selectively secured to the first and second front coupling devices.

20. The method according to claim 19, further comprising:
mounting a first foot to the first face, wherein the first foot is wedge shaped; and
mounting a second foot to the second face, wherein the second foot is wedge shaped.

21. The method according to claim 20, further comprising:
inserting the electronic component into the landing zone;
engaging the first foot into the first wedge bracket; and
engaging the second foot into the second wedge bracket.

22. The method according to claim 19, further comprising inserting the electronic component into the landing zone, securing the first bracket to the first coupling device, and securing the second bracket to the second coupling device.

23. A system to mount an electronic component on a shelf, comprising:
a first restraining device associated with a support structure in a first location, the first restraining device configured to operably engage a mating piece associated with the electronic component, and the support structure configured to guide the electronic component along an axis of insertion when introduced to the shelf; and
a second restraining device associated with the support structure in a second location, the second restraining device configured to secure the electronic component via one or more fastening elements,
wherein the first restraining device is a structure with an inclined slot to accommodate a wedge-shaped structure associated with the electronic component as the electronic component is inserted into the shelf, and
wherein at least one of the wedge-shaped structure and the structure with the inclined slot includes a rubber grip surface.

24. A system to mount an electronic component on a shelf, comprising:
a first restraining device associated with a support structure in a first location, the first restraining device configured to operably engage a mating piece associated with the electronic component, and the support structure configured to guide the electronic component along an axis of insertion when introduced to the shelf; and
a second restraining device associated with the support structure in a second location, the second restraining device configured to secure the electronic component via one or more fastening elements,
wherein the first restraining device is a structure with an inclined slot to accommodate a wedge-shaped structure associated with the electronic component as the electronic component is inserted into the shelf, and
wherein at least one of the wedge-shaped structure and the structure with the inclined slot includes a rubber grip surface, and
wherein the wedge-shaped structure comprises a metal that is galvanically compatible with the structure with the inclined slot.

25. A system to mount an electronic component on a shelf, comprising:
a first restraining device associated with a support structure in a first location, the first restraining device configured to operably engage a mating piece associated with the electronic component, and the support structure configured to guide the electronic component along an axis of insertion when introduced to the shelf; and
a second restraining device associated with the support structure in a second location, the second restraining device configured to secure the electronic component via one or more fastening elements,
wherein the second restraining device includes a first bracket disposed on a first face and a second bracket disposed on a second face, wherein the first bracket and the second bracket couple the electronic component to the support structure.

26. A system to mount an electronic component on a shelf, comprising:
a first restraining device associated with a support structure in a first location, the first restraining device configured to operably engage a mating piece associated with the electronic component, and the support structure configured to guide the electronic component along an axis of insertion when introduced to the shelf; and
a second restraining device associated with the support structure in a second location, the second restraining device configured to secure the electronic component via one or more fastening elements,
wherein the second restraining device includes a first bracket disposed on a first face and a second bracket disposed on a second face, wherein the first bracket and the second bracket couple the electronic component to the support structure,
and wherein each of the first bracket and the second bracket is hinged, removable, or pivotally secured and is operable to move to a stowed configuration or location when the electronic component is not positioned in the cabinet.

27. A system to mount an electronic component on a shelf, comprising:
a first restraining device associated with a support structure in a first location, the first restraining device configured to operably engage a mating piece associated with the electronic component, and the support structure configured to guide the electronic component along an axis of insertion when introduced to the shelf; and
a second restraining device associated with the support structure in a second location, the second restraining device configured to secure the electronic component via one or more fastening elements,
wherein the second restraining device includes a first bracket disposed on a first face and a second bracket disposed on a second face, wherein the first bracket and the second bracket couple the electronic component to the support structure,
and wherein each of the first bracket and the second bracket has a respective slot that aligns with a respective aperture defined by the support structure to secure the electronic component to the support structure.

* * * * *